United States Patent [19]

Akasu

[11] Patent Number: 4,959,996

[45] Date of Patent: Oct. 2, 1990

[54] CONTROL SIGNAL GENERATOR FOR AN INTERNAL COMBUSTION ENGINE

[75] Inventor: Masahira Akasu, Himeji, Japan

[73] Assignee: Mitsubishi Denki Kabushiki Kaisha, Tokyo, Japan

[21] Appl. No.: 412,738

[22] Filed: Sep. 26, 1989

[30] Foreign Application Priority Data

Sep. 27, 1988 [JP] Japan ................................ 63-239742

[51] Int. Cl.[5] ............................................ G01M 15/00

[52] U.S. Cl. ...................................... 73/116; 123/414; 364/431.05

[58] Field of Search .................. 73/116; 123/414, 418; 324/169, 392; 364/431.03, 431.05

[56] References Cited

U.S. PATENT DOCUMENTS 4,700,305 10/1987 Lotterbach et al. ........... 364/431.03

FOREIGN PATENT DOCUMENTS 3017971 11/1981 Fed. Rep. of Germany ...... 123/414

*Primary Examiner*—Robert Raevis

*Attorney, Agent, or Firm*—Sughrue, Mion, Zinn, Macpeak and Seas

[57] ABSTRACT

A signal control generator for a multi-cylinder internal combustion engine has a position sensor which generates output pulses which indicate prescribed rotational angles of the crankshaft of the engine for each cylinder. The output pulse for a prescribed reference cylinder of the engine is shorter than the pulses for the other cylinders. The reference cylinder is recognized by comparing the pulse width or the duty cycle of each pulse with the pulse width or the duty cycle for previous pulses corresponding to other cylinders of the engine. The period between consecutive output pulses is used to control the ignition timing of the engine.

5 Claims, 3 Drawing Sheets

CONTROL SIGNAL GENERATOR FOR AN INTERNAL COMBUSTION ENGINE

BACKGROUND OF THE INVENTION

This invention relates to a control signal generator for generating control signals for an internal combustion engine. More particularly, it relates to a control signal generator which can generate signals for use in controlling both the ignition timing and the fuel injection of the engine.

In order for an internal combustion engine to operate optimally, fuel injection and ignition must take place at prescribed rotational angles of the crankshaft, i.e., when each piston of the engine is at a prescribed position with respect to top dead center. For this reason, an engine is equipped with a signal generator having a rotational position sensor which senses the rotational angle of the crankshaft of the engine. One common type of position sensor is in the form of a rotating plate mounted on a rotating shaft (such as the distributor shaft) which rotates in synchrony with the crankshaft of the engine. The rotating plate has projections formed thereon which can be detected by a transducer disposed in the vicinity of the rotating plate. The transducer generates electrical signals as the projections pass by it. The projections, which equal the number of cylinders, are disposed so as to correspond to prescribed rotational angles of the crankshaft and thus to prescribed positions of each piston.

In addition to knowing when the crankshaft reaches a prescribed rotational position for each cylinder, in engines in which the cylinders are individually controlled, it is necessary to be able to identify each cylinder. A signal generator of an engine which performs individual control of the cylinders is therefore equipped with second position sensor for sensing when the crankshaft rotational angle is such that the piston of a specific reference cylinder is in a prescribed position. The second position sensor is similar in structure to the above-described position sensor and usually consists of a rotating plate having only a single projection and a magnetic transducer which generates an output signal when the projection passes by it. By using the outputs of the two position sensors in conjunction, it can be determined which cylinder of an engine is firing at any given time.

Thus, a conventional control signal generator for an engine is frequently equipped with two different position sensors. However, as position sensors are expensive and each sensor requires a separate interface circuit for connection to an engine controller, the use of two separate position sensors is uneconomical. It is also disadvantageous from the standpoint of space utilization in an engine.

SUMMARY OF THE INVENTION

Accordingly, it is an object of the present invention to provide a control signal generator for an internal combustion engine which can detect a prescribed rotational position of the crankshaft for each cylinder of the engine as well as recognize a prescribed cylinder while using only a single position sensor.

It is another object of the present invention to provide a control signal generator which can operate accurately when the engine rotational speed is in transition.

A control signal generator according to the present invention has a single rotational position sensor which generates for each cylinder a signal indicating a first rotational position and second rotational position of the crankshaft of the engine. One of the rotational positions is different for a prescribed reference cylinder of the engine than for the other cylinders of the engine. Based on the output signal of the position sensor, a first period sensor measures a first period between consecutive first rotational positions or the period between consecutive first rotational positions. The first period is used to control the timing of engine ignition. A second period sensor measures a second period between consecutive first and second rotational positions. In one form of the invention, a comparator compares the most recently measured value of the second period with a previously measured value of the second period which is stored in a memory. The second period is different for the reference cylinder than for the other cylinders. Therefore, when the most recently measured second period differs from the previously measured value of the second period, the reference cylinder can be identified.

In another form of the invention, a ratio calculator calculates the ratio of the second period to the first period, and the comparator compares the most recently calculated ratio with a previously calculated ratio which is stored in the memory. The ratio is different for the reference cylinder than for the other cylinders, so the reference cylinder can be identified by determining when the most recently measured ratio is different from the ratio stored in the memory.

In preferred embodiments, the rotational position sensor comprises a plurality of projections which are mounted on a distributor shaft, and a transducer which generates an output pulse each time one of the projections passes by it. However, the position sensor is not restricted to any particular type, as long as it can generate signals indicating first and second rotational positions of the crankshaft, one of the positions being different for a reference cylinder than for the other cylinders of the engine. The transducer can be of various types, such as a magnetic or an optical transducer. Instead of having projections on a shaft, the position sensor can have a rotating disk with slits formed in it, and the transducer can be an optical transducer which detects the passage of light through the slits.

DESCRIPTION OF THE PREFERRED EMBODIMENTS

Figure 1:
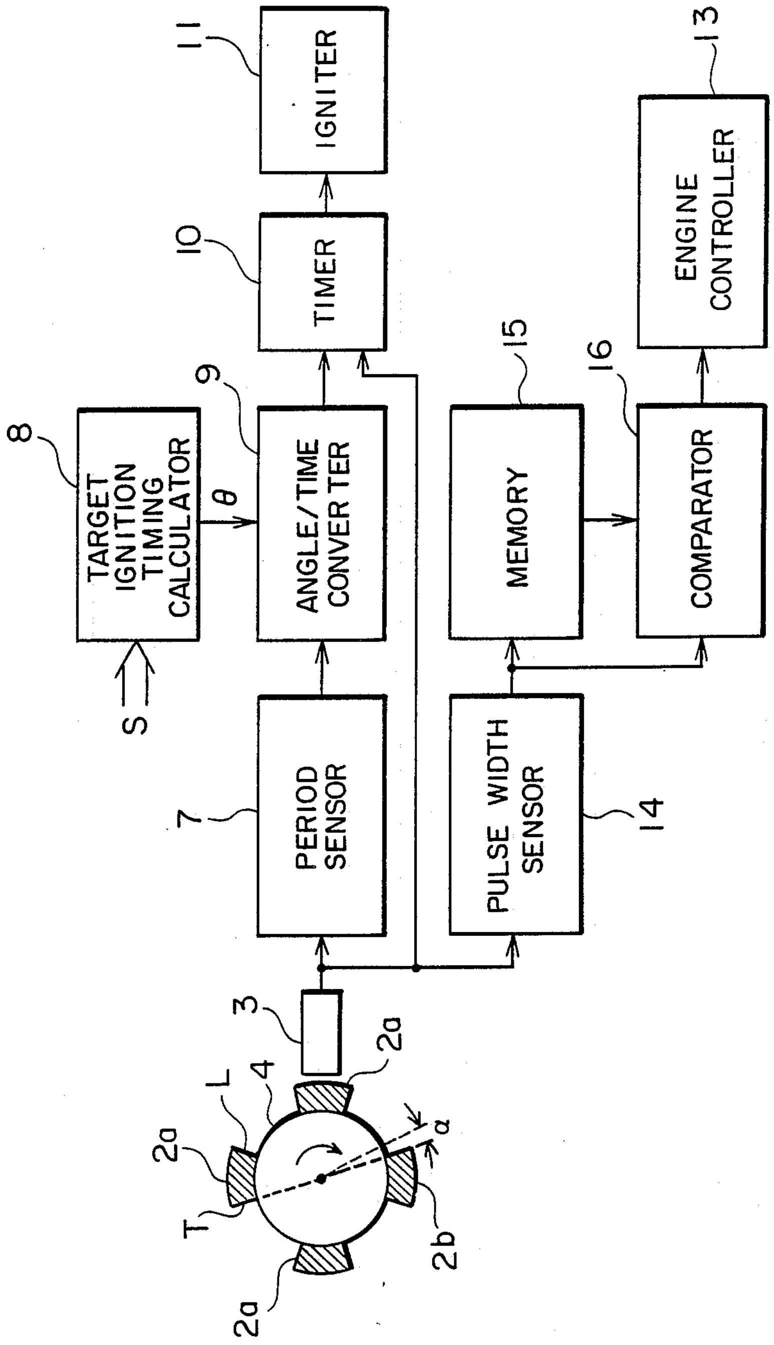
FIG. 1 is a block diagram of a first embodiment of a signal generator according to the present invention.

A number of preferred embodiments of a signal generator according to the present invention will now be described while referring to the accompanying drawings. FIG. 1 is a block diagram of a first embodiment of the present invention as applied to an unillustrated four-cylinder engine. As shown in this figure, a rotating shaft 4 is rotated in the direction of the arrow in synchrony with the rotations of the engine. The rotating shaft 4 can be, for example, a distributor shaft which is rotated by the cam shaft of the engine. Four projections 2*a* and 2*b* are secured to the periphery of the rotating shaft 4. The number of projections equals the number of cylinders in the engine, so if the signal generator of the present invention were applied to a six-cylinder engine, for example, there would be a total of six projections. Three of the projections 2a have the same length in the circumferential direction of the rotating shaft 4, while the fourth projection 2b has a different length from the other projections 2a. The fourth projection 2b functions as a reference projection for sensing a reference cylinder, which in this case is cylinder #1, although any one of the cylinders can be employed as the reference cylinder. In the present embodiment, the fourth projection 2b is shorter in the circumferential direction than the other projections 2a , but it could instead be made longer than the others. Each of the projections 2a and 2b has a leading edge L and a trailing edge T. The leading edges L of all four projections 2a and 2b are equally spaced around the rotating shaft 4 at intervals of 90 degrees. The trailing edges T of the projections are also equally spaced around the circumference of the shaft 4 except for the trailing edge T of the fourth projection 2b, which is offset by an angle $\alpha$ from the theoretical location of its trailing edge (shown by a dashed line in FIG. 1) if the fourth projection 2b had the same length as the other projections 2a.

Figure 2:
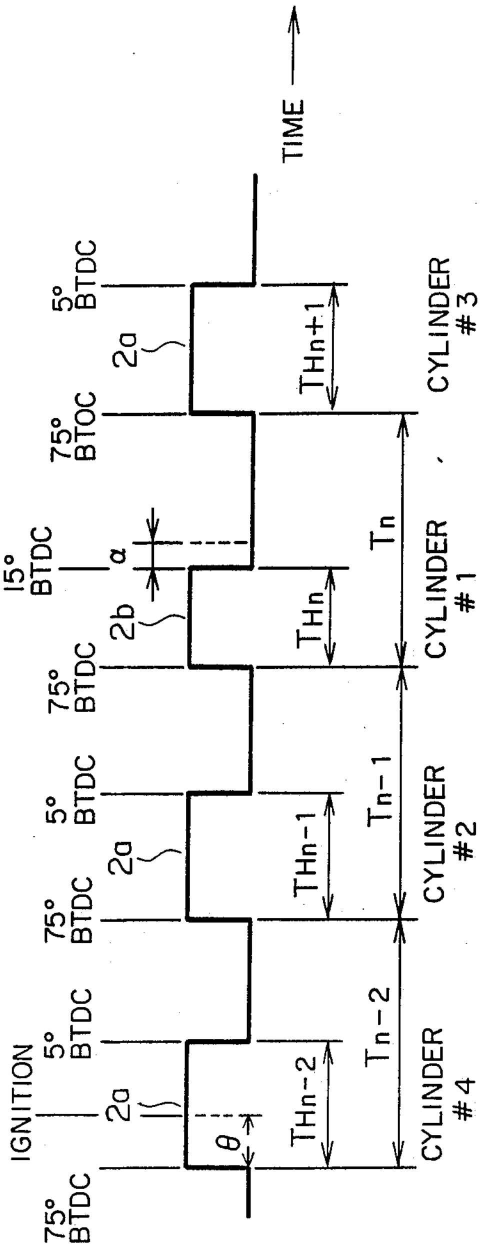
FIG. 2 is a timing diagram of the output of the transducer 3 of FIG. 1.

A transducer 3 for sensing the projections is disposed in the vicinity of the rotating shaft 4. It senses when one of the projections 2a or 2b passes by it and generates electrical output signals as shown in FIG. 2. The transducer 3 can be one which interacts magnetically with the projections (such as an inductive sensor or a Hall sensor), or it can be a photodiode or other device which interacts optically with the projections. In this embodiment, the output signals are in the form of pulses having a rising edge which occurs when the leading edge L of one of the projections passes in front of the transducer 3 and a falling edge which occurs when one of the trailing edges T of the projections passes in front of the transducer 3. The rising edge of each pulse constitutes a first signal indicating a first rotational position of the crankshaft, and the falling edge constitutes a second signal indicating a second rotational position of the crankshaft. In FIG. 2, a rising edge of an output pulse occurs when a piston is at 75° BTDC. For all but the reference cylinder, the falling edge occurs when the piston of that cylinder is at 5° BTDC, but for the reference cylinder (cylinder #1), the falling edge occurs when the piston is at 15° BTDC. In this case, $\alpha = 10°$. However, the rotational angles corresponding to the rising and falling edges and the value of $\alpha$ in FIG. 2 are just examples, and different values can be employed.

The output signal from the transducer 3 is input to a period sensor 7 which measures the period T between consecutive output pulses of the transducer 3. In this embodiment, it measures the period between consecutive rising edges of the output signal, but it could instead measure the period between consecutive falling edges. The period sensor 7 generates an output signal indicating the measured period T and provides it to an angle/time converter 9. A target ignition timing calculator 8, which is connected to various unillustrated sensors, receives input signals S from the sensors indicating the engine operating state. Based on these signals S, the calculator 8 calculates a target ignition timing $\Theta$, which is an angle indicating the number of degrees of crankshaft rotation after the rising edge of the output signal of the transducer 3 at which firing should take place in each cylinder. Based on the rotational speed of the engine as indicated by the period T measured by the period sensor 7, the angle/time converter 9 calculates a length of time corresponding to the angle $\Theta$ and provides a signal indicating this length of time to a timer 10, which is set to the calculated length of time. The timer 10 is triggered by the rising edge of the output signal from the transducer 3, and after the set time has elapsed, the timer 10 provides a control signal to an igniter 11, which ignites the spark plugs of the engine.

The output signal from the transducer 3 is also input to a pulse width sensor 14 which measures the pulse width TH of the output pulses from the transducer 3. The pulse width sensor 14 generates an output signal indicating the measured pulse width TH and provides it to a memory 15 and a comparator 16. In the present embodiment, the memory 15 stores four consecutive outputs of the pulse width sensor 14, i.e., all the pulse widths TH measured during a single cycle of the engine. The comparator 16 compares the most recently measured pulse width $TH_{n+1}$, which corresponds to one of the cylinders, with the pulse widths $TH_n$, $TH_{n-1}$, and $TH_{n-2}$, which are stored in the memory 15 and correspond to the three preceding cylinders. The comparator 16 generates an output signal having a first level when the most recent pulse width $TH_{n+1}$ is shorter than the other three pulse widths $TH_n$, $TH_{n-1}$ and $TH_{n-2}$, and it generates an output signal having a second level when the most recent pulse width $TH_{n+1}$ is not shorter than the other pulse widths. The pulse width TH is shortest for the reference cylinder (cylinder #1), so the output signal of the comparator 16 has the first level only when the most recent output signal from the transducer 3 corresponds to the reference cylinder. The output signal of the comparator 16 is input to an engine controller 13 as a cylinder recognition signal. As the firing order of the cylinders is known, the controller 13 can determine which cylinder is firing at any time based on the output signal of the comparator 16. Based on the output signal of the comparator 16, the controller 13 controls the fuel injection and other operations of the engine. Engine controllers which perform such control operations on the basis of a cylinder recognition signal identifying a reference cylinder are well known so a description of the structure and operation of the engine controller 13 will be omitted.

Figure 3:
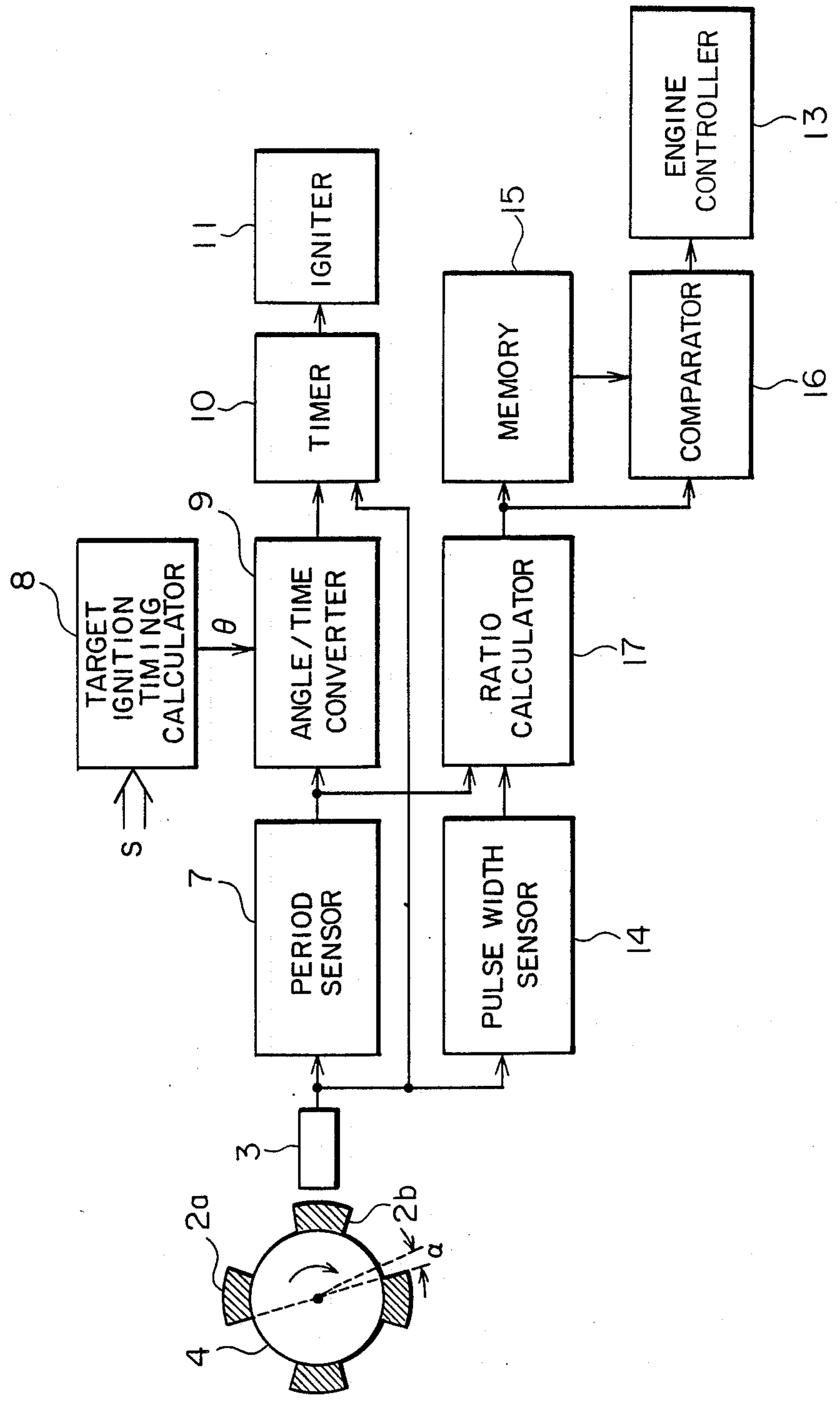
FIG. 3 is a block diagram of a second embodiment of the present invention.

FIG. 3 is a block diagram of a second embodiment of this invention. It differs from the first embodiment in that it further includes a ratio calculator 17 which is connected between the pulse width sensor 14 and the memory 15. The ratio calculator 17 receives the output signals from the period sensor 7 and the pulse width sensor 14 and calculates the ratio TH/T of the pulse width TH to the period T of each output pulse of the transducer 3. The calculated ratios are successively input to the memory 15, and the comparator 16 compares the most recently calculated ratio with the three preceding ratios which are stored in the memory 15. If the most recent ratio is the smallest of the ratios, the comparator 1 6 generates an output signal having a first level, which indicates that the reference cylinder is recognized. If the most recent ratio is not the smallest of the ratios, then the comparator 16 generates an output signal having a second level, which indicates one of the other cylinders. The structure and operation of this embodiment are otherwise the same as that of the embodiment of FIG. 1. Comparison of ratios to identify the reference cylinder is advantageous because accurate results can be obtained even when the engine rotational speed is in transition. It also has the advantage that it negates the effect of sensor error which commonly occurs in electronic sensing circuits and which is characterized by the entire output deviating in one direction.

The rotational speed of an engine greatly varies when the engine is started, and under these conditions, it is difficult to perform accurate cylinder recognition. Therefore, it may be desirable to operate the apparatus of the present invention only after the engine speed reaches a prescribed level.

In the above-described embodiments, cylinder recognition is performed on the basis of a comparison of pulse widths TH or ratios TH/T. However, it is also possible to perform cylinder recognition on the basis of a comparison of average or filtered values.

In the illustrated embodiments, the transducer 3 generates a high output signal when it detects the leading edge L and a low output signal when it detects the trailing edge T of a projection. However, the polarity of the output signal of the transducer is not critical to the operation of the present invention and can be reversed.

As described above, a control signal generator according to the present invention can provide control signals for controlling both ignition timing and fuel injection using only a single rotational positional sensor. Therefore, it is less expensive and more compact than a conventional signal generator which must employ two position sensors and a separate interface for each position sensor.

What is claimed is:

1. A control signal generator for a multi-cylinder engine comprising:

a rotational position sensor for generating for each cylinder a signal indicating a first rotational position and a second rotational position of a crankshaft of the engine, the first and second rotational positions corresponding to first and second positions with respect to top dead center of a piston of each cylinder, the period between the first and second rotational positions being different for a prescribed reference cylinder of the engine than for the other cylinders of the engine;

first period measuring means responsive to the signal from the position sensor for measuring a first period between consecutive occurrences of one of the rotational positions and generating a corresponding signal;

second period measuring means responsive to the signal from the position sensor for measuring a second period between consecutive first and second rotational positions and generating a corresponding signal;

ratio calculating means for calculating the ratio of the second period to the first period;

a memory for storing the calculated ratio; and a comparator for comparing the most recently measured ratio with a previously calculated ratio which is stored in the memory and generating a signal indicative of the results of comparison.

2. A control signal generator as claimed in claim 1, wherein:

the memory comprises means for storing the values of each of the ratios calculated during a single cycle of the engine; and the comparator comprises means for comparing the most recently calculated ratio with all of the other ratios stored in the memory for the same cycle of the engine.

3. A control signal generator as claimed in claim 1, wherein the first rotational position is the same for each of the cylinders, the second rotational position is later than the first rotational position, and the second rotational position is the same for all of the cylinders except the reference cylinder.

4. A control signal generator as claimed in claim 3, wherein the second rotational position is earlier for the reference cylinder than for the other cylinders.

5. A method for recognizing a reference cylinder of a multi-cylinder internal combustion engine comprising:

generating for each cylinder a first signal and a second signal at a prescribed first and second positions of the piston of the cylinder with respect to top dead center, one of the positions being different for a reference cylinder than for the other cylinders of the engine;

measuring a first period between consecutive occurrences of one of the signals;

measuring a second period between consecutive first and second signals;

calculating the ratio of the second period to the first period;

comparing the most recently calculated ratio with all of the ratios which were previously calculated in the same engine cycle; and determining that the cylinder corresponding to the most recently calculated ratio is the reference cylinder when the most recently calculated ratio is different from the other ratios for the same engine cycle.

* * * * *